INVENTOR
A. J. HARENDZA-HARINXMA
BY
ATTORNEY

United States Patent Office 3,487,522

Patented Jan. 6, 1970

3,487,522

MULTILAYERED THIN-FILM INTERMEDIATES EMPLOYING PARTING LAYERS TO PERMIT SELECTIVE, SEQUENTIAL ETCHING

Alfred J. Harendza-Harinxma, Trenton, N.J., assignor to Western Electric Company, Incorporated, New York, N.Y., a corporation of New York Filed Feb. 1, 1966, Ser. No. 524,056
Int. Cl. B23p 3/00
U.S. Cl. 29—195 6 Claims

ABSTRACT OF THE DISCLOSURE

Multi-layered thin-film intermediates, usable to fabricate integrated, thin-film circuits, empoly an anodizable semi-metal as a parting or etch-stop layer between a resistive layer and a conductive layer deposited on a substrate. The parting layer permits selective etching of the resistive and conductive layers, and also provides electrical interconnection therebetween. The semi-metal is selected from the group consisting of antimony, bismuth, molybdenum, tungsten and zirconium.

This invention relates to the manufacture of thin-film integrated circuits. More particularly, this invention relates to multilayered, thin-film coated intermediates which can be processed into integrated thin-film circuits and to methods of producing integrated thin-film circuits from such intermediates. Accordingly, the general objects of this invention are to provide new and improved intermediates and methods of manufacture of such character.

A typical integrated thin-film circuit may include a plurality of interconnected thin-film devices of superposed films of conductive, semiconductive, resistive and/or nonconductive material supported on a single substrate. It has been found that such a circuit may best be fabricated by sequentially depositing the several films as coextensive area films, and then selectively and sequentially etching the films to their desired configurations. This process not only eliminates the need for masking during deposition but also, if the depositions are effected in a single vacuum processing machine, eliminates the possibility of contamination between depositions and minimizes the time and cost of fabrication.

Use of the above process leads to a problem, however, where two contiguous layers are composed of the same material or of two materials attacked by the same etchants. In this instance, as disclosed in the copending applications of J. W. Balde, Ser. No. 409,656, filed Nov. 9, 1964, now Patent No. 3,406,043 and E. A. La Chapelle, Ser. No. 409,890, filed Nov. 9, 1964, now Patent No. 3,387,952 both of which are assigned to the same assignee as the instant application, it is necessary to employ an intermediate layer, termed as a "parting layer," between the contiguous layers to protect the lower layer while the upper one is being etched.

It is therefore, another object of this invention to provide new and improved parting layer materials for use between layers of a multilayered thin-film intermediate which are attacked by the same etchants, to enable sequential etching of these layers.

An example of the use of layers of materials attacked by the same etchants is found in the fabrication of thin-fium integrated RC circuits. Thin-film resistors may be fabricated by selectively etching a thin film of an anodizable resistive material to form a plurality of thin-film resistors and then anodizing the resistors to trim them to value. Thin-film capacitors may be fabricated by selectively etching a thin film of an anodizable conductive material to form a plurality of individual lower capacitor electrodes, anodizing the lower electrodes to form respective capacitor dielectric layers, and depositing counter electrodes of conductive material over the dielectrics. Two materials which have been found to be particularly suitable for forming thin-film resistors are tantalum nitride and niobium nitride. However, these materials, when anodized, form dielectric layers of relatively low dielectric constant, high dissipation factor and poor stability and, accordingly, are not suitable for use in forming capacitor dielectrics. For this purpose, tantalum or niobium has been found to be best. These materials, however, do not produce very good resistors. Accordingly, to fabricate a thin-film RC circuit with optimum characteristics, it is necessary to employ a film of tantalum nitride or niobium nitride for the resistors and a film of tantalum or niobium for the capacitors. All of these materials, however, are attacked by the same etchants. Therefore, to fabricate an integrated RC circuit with these materials, and to do so by using the advantageous sequential deposition and etching process mentioned above, requires the use of a parting layer between the resistor-forming film and the capacitor-forming film.

The present invention is predicated upon the discovery that a certain group of materials possess characteristics which make them particularly suitable as parting layers. These materials are antimony, bismuth, molybdenum, tungsten and zirconium. These materials are not attacked by the same etchants which attack the resistor-forming and capacitor-forming materials, and are attacked by etchants which do not attack the resistor-forming and capacitor-forming materials. Moreover, these materials are sufficiently conductive to provide electrical continuity between the resistor-forming film and the capacitor-forming film, and are anodizable. Without this latter characteristic (ability to be anodized) it would not be possible to anodize the capacitor-forming film to form a capacitor dielectric, since non-anodizable materials when subjected to anodizing go into solution with the anodizing electrolyte, thereby undercutting and floating away any overlying films.

The following table shows both the resistivity and the dielectric constant of the anodic oxide of these five materials and also of the aluminum used in the parting layer of the aforementioned La Chappelle patent.

| Material: | Resistivity μΩ-Cm. at 20° C. | Dielectric Constant |
|---|---|---|
| Antimony | 41.7 | 20 |
| Bismuth | 120 | 18 |
| Molybdenum | 5.7 | ---------- |
| Tungsten | 5.6 | 42 |
| Zirconium | 40 | 12 |
| Aluminum | 2.8 | 10 |

These data may be found in the Handbook of Chemistry & Physics, 38th ed., Chemical Rubber Publishing Co., Cleveland, Ohio (1956), p. 2359; and the Metals Handbook, 8th ed., vol. I, ASM, Metals Park, Ohio (1954), p. 1228.

Accordingly, another object of this invention is to provide new and improved parting layer materials for use between resistor-forming films of tantalum nitride or niobium nitride, and capacitor-forming films of tantalum or niobium.

Other objects, advantages and features of the invention will become apparent from the following detailed description thereof, when considered in conjunction with the appended drawings, wherein.

It should be noted that the thickness of the layers shown in the cross-sectional view of FIGS. 2–11 have been greatly enlarged and exaggerated for the sake of clarity of illustration.

COMPOSITION AND FABRICATION OF INTERMEDIATE

The present invention will conveniently be described in detail by reference to the following illustrative example in which the resistor-forming layer is composed of tantalum nitride, the parting layer is composed of antimony and the capacitor-forming layer is composed of tantalum.

Figure 2:
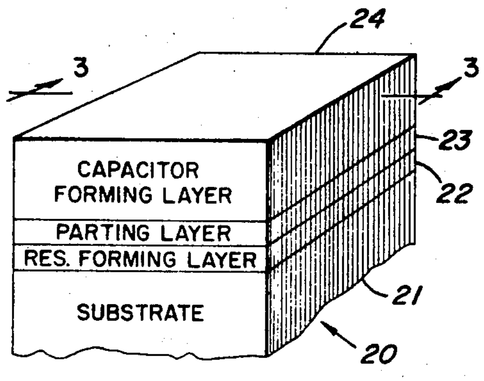
FIGS. 2–11 depict a conversion of the multilayered thin-film intermediate of this invention into a thin-film integrated circuit in accordance with one of the processes illustrated in FIG. 1.
Figure 3:
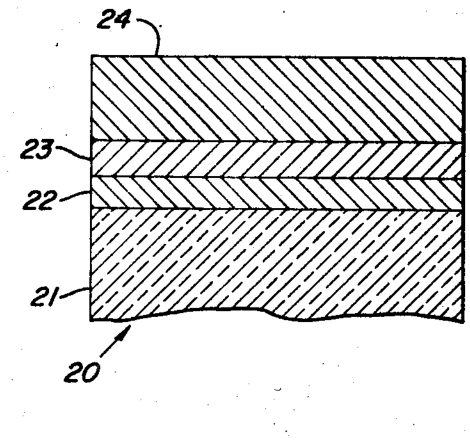

Referring now to the drawings and, particularly, to FIGS. 2 and 3, there is shown a multilayered, thin-film intermediate 20 embodying certain features of the invention. The intermediate 20 comprises a nonconductive substrate 21 of glass or ceramic, a resistor-forming layer 22 of tantalum nitride, a parting layer 22 of antimony, and a capacitor-forming layer 24 of tantalum.

The first step in the fabrication of the intermediate 20 is cleaning of the substrate 21 to remove all organic contamination. This may be accomplished by any suitable, conventional cleaning technique.

The next step is deposition of the resistor-forming layer 22 of tantalum nitride. This may be accomplished by a conventional cathodic sputtering process carried out in an inert atmosphere which contains 5% nitrogen.

After deposition of the tantalum nitride layer 22, the antimony parting layer 23 is deposited thereover by a conventional cathodic sputtering or vacuum evaporation technique.

The final step in the fabrication of the intermediate 20 is deposition of the capacitor-forming layer 24 of tantalum over the antimony parting layer 23 by sputtering.

In general, the thickness of the layers 22, 23 and 24 are not critical. For the purposes discussed herein such layers are preferably within the following ranges:

| | Angstroms |
|---|---|
| Layer **22** | 1000–1400 |
| Layer **23** | 2000–3000 |
| Layer **24** | 4000–5000 |

As previously noted, it has been found preferable to deposit the layers 22, 23 and 24 as coextensive area films in a single processing system. To this end, the layers 22, 23 and 24 may be deposited by transmitting the substrate 21, after cleaning, through a continuous in-line vacuum processing machine of the type described in the copending application of S. S. Charschan et al. Ser. No. 314,412, filed Oct. 7, 1963, and assigned to the same assignee as the instant application.

CONVERSION OF INTERMEDIATE INTO INTEGRATED CIRCUIT

After fabrication, the intermediate 20 is processed into any desired integrated RC circuit. This may be done immediately, or it may be done at some later time. The steps involved in the processing will be conveniently described in detail by reference to the following illustrative example wherein the intermediate 20 is converted into the single frequency rejection filter of FIG. 12.

Figure 4:
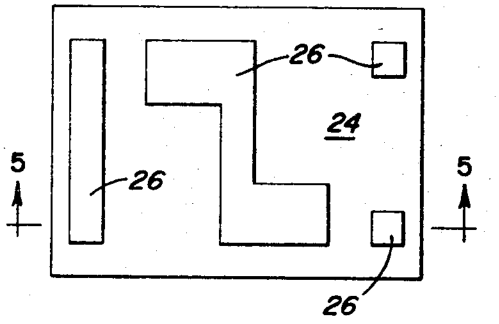

Referring to FIG. 4, the first step in the conversion comprises masking those areas of the layer 24, which are to serve as capacitor lower electrodes, conductive paths, and terminal pads, with an etch resist 26. These areas will hereinafter be referred to collectively as the "conductive pattern." The etch resist 26 may be applied in any suitable manner. Advantageously, the resist 26 may be applied by a conventional silk screening process. Alternatively, it may be applied by a photolithographic process which comprises coating the entire surface of the layer 24 with a conventional photoresist, and exposing those areas of the coated layer which are to be masked to light. The layer 24 is then subjected to a conventional photographic development process which renders the exposed areas of the photoresist acid resistant and removes the unexposed areas, uncovering the underlying layer 24.

Figure 5:
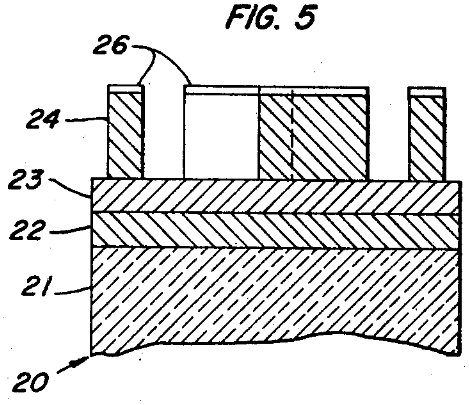

After generation of the etch resist pattern, the layer 24 is subjected to an etchant which will attack the layer 24, but will not attack the underlying parting layer 23. In the present instance, with a layer 24 of tantalum and a parting layer 23 of antimony, the etchant employed may be hot sodium hydroxide. The hot sodium hydroxide attacks and dissolves the exposed tantalum areas, but does not attack the protected tantalum areas or the antimony parting layer 23. The resultant structure is shown in FIG. 5, which is a cross-sectional view of the intermediate 20 of FIG. 4 after etching.

Figure 1:
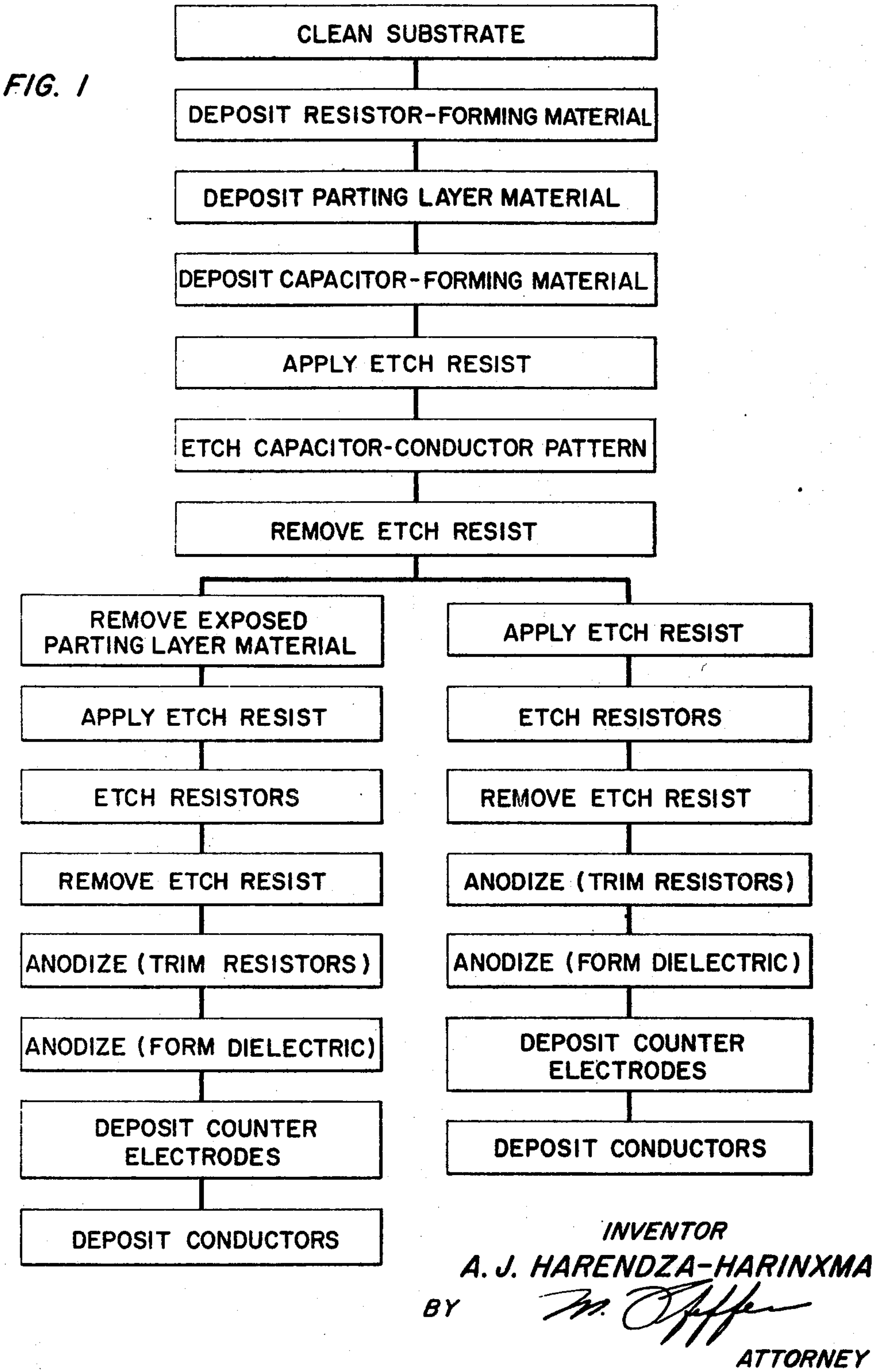
FIG. 1 is a flow chart of alternative processes, embodying certain principles of the invention, for fabricating a thin-film integrated circuit.

After etching, the resist 26 is removed. At this stage in the processing, it is possible to proceed in either of two ways. The first process, outline in the lefthand branch of the flow chart of FIG. 1, is illustrated in FIGS. 6 through 11. The righthand branch of the flow chart of FIG. 1 has not been otherwise depicted in the drawings but will be briefly explained below.

Figure 6:
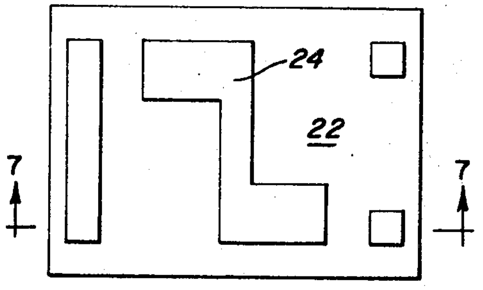
Figure 7:
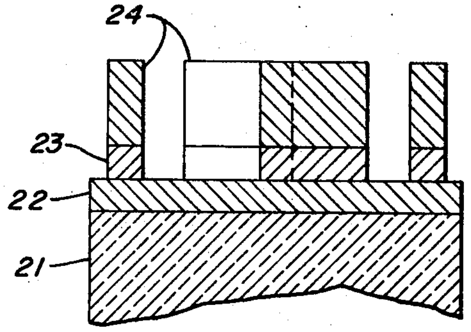

The next step, in accordance with the first or lefthand process outlined in FIG. 1, comprises the removal of those portions of the antimony parting layer 23 which were exposed during the etching of the tantalum layer 24. This may be effected by subjecting the antimony to an etchant, such as hot sulfuric acid, which will dissolve antimony but will not attack either the underlaying tantalum nitride layer 23 or the tantalum layer 24. Antimony readily dissolves in sulfuric acid whereas both tantalum and tantalum nitride are unaffected thereby. Since the sulfuric acid will not attack tantalum, it is unnecessary to apply a coating of etch resist over the tantalum layer 24 during the antimony removal step. FIGS. 6 and 7, respectively, show top and sectional views of the intermediate 20 after removal from the sulfuric acid bath. As may be seen from FIGS. 6 and 7, removal of the exposed antimony exposes portions of the resistor-forming layer 22.

Figure 8:
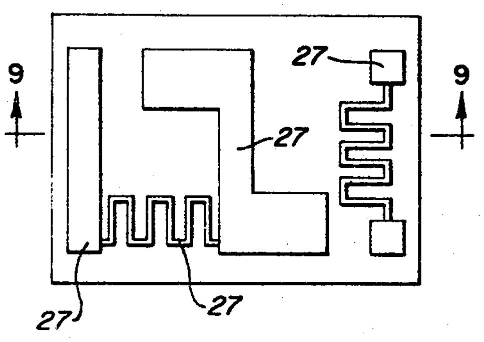

Referring to FIG. 8, the next step in the process comprises masking those areas of the exposed resistor-forming layer 22, which are to form thin-film resistors, with an etch resist 27. Additionally, since tantalum and tantalum nitride are attacked by the same etchants, it is necessary to apply the etch resist 27 to the tantalum conductive pattern. The etch resist 27 may be applied photolithographically in the same manner as the etch resist 26, or by any other suitable process, such as silk screening.

Figure 9:
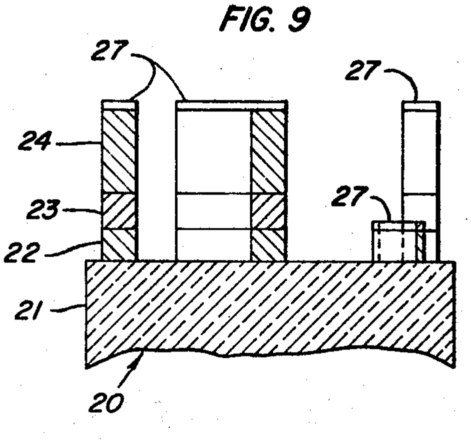

After protection of the tantalum conductive pattern and the portions of the tantalum nitride layer 22 which are to form the resistors, the unprotected tantalum nitride is removed with an etchant of hot sodium hydroxide. Alternatively, the etchant may comprise a mixture of hydrofluoric and nitric acid. If this latter etchant is employed, a protective oxide layer, such as a layer of tantalum pentoxide, should preferably have been deposited on the substrate 21 prior to deposition of the layers 22, 23 and 24. The function of such an oxide layer is to prevent undercutting of the substrate 21 during etching of the layer 22 with the hydrofluoric-nitric acid etchant. A more complete understanding of the purpose and function of protective oxide layer may be had by referring to U.S. Patent 3,220,938, issued Nov. 30, 1965, to D. A. McLean et al. The resultant structure, after etching, is shown in FIG. 9, which is a cross-sectional of the intermediate of FIG. 8 after etching.

As should be apparent, the value of each resistor is a function of the resistivity of the tantalum nitride and the resistor length, width and thickness. In order to obtain resistors of high precision, these factors, in accordance with customary practice, are selected such that the values of the resistors after etching approximate, but are less than, the desired values. The resistors are then accurately brought up to the desired values by subjecting them to an anodizing process which reduces the effective thickness of each resistor and thereby increases the resistance thereof. For a more complete description of anodizing thin-film resistors to value see U.S. Patent 3,148,129, issued Sept. 8, 1964, to H. Basseches et al. Prior to anodization, of course, it is necessary to remove the etch resist 27 with a suitable solvent.

The next step in the process is formation of the capacitor dielectrics. This is accomplished by anodizing those portions of the exposed tantalum layer 24 which are to serve as capacitor lower electrodes. Anodization of the exposed tantalum forms an overlying dielectric layer of tantalum pentoxide. The anodization is allowed to proceed to the voltage which, taking into consideration the area of the lower electrodes, will provide oxide-dielectrics 28—28 (FIG. 11) of the proper thickness to produce capacitors having the desired capacitance. Then, gold counter electrodes 29—29 are deposited over the dielectrics 28—28 to complete the capacitors. Typically, the gold electrodes 29—29 will be vapor deposited through a mask in a batch type operation carried on in apparatus such as a bell jar. For a more complete description of the fabrication of thin-film capacitors, reference may be had to U.S. Patent 2,993,266, issued July 25, 1961, to R. W. Berry.

Figure 10:
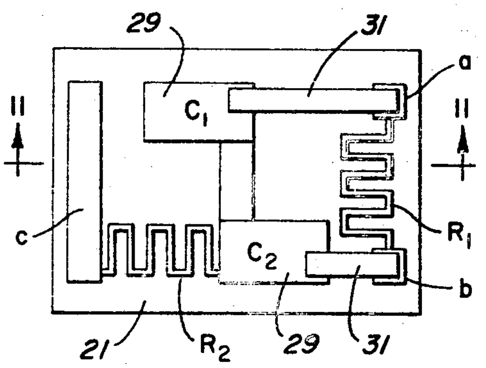
Figure 11:
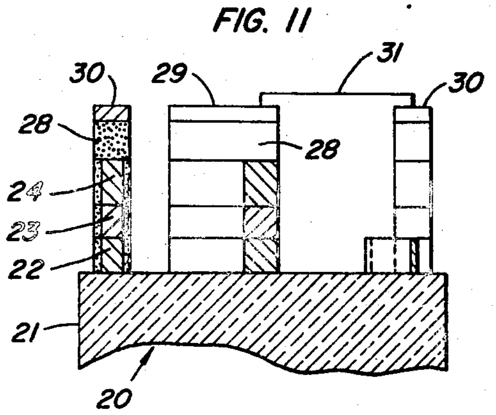
Figure 12:
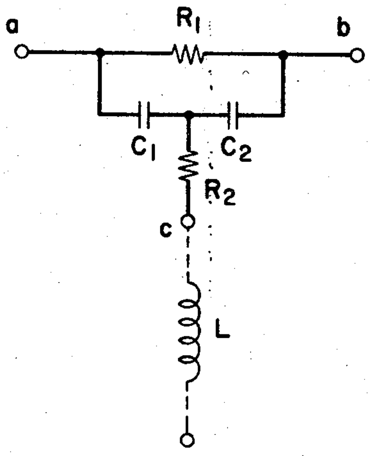
FIG. 12 is an electrical schematic of the thin-film integrated circuit fabricated in accordance with the conversion depicted in FIGS. 2–11.

Finally, to complete the integrated thin-film circuit, the terminal pads are plated with a conductive material 30 (FIG. 11) and conductive paths 31—31 are deposited where needed. The conductive paths 31—31 and the material 30 may be composed of a single, highly conductive metal, such as gold, or they may be composed of successive layers of Nichrome (a nickel-chromium alloy), copper and palladium, as disclosed in the aforementioned Balde and La Chapelle applications. The conductive material 30, instead of being deposited at this point in the process, could have been deposited as an area film over the capacitor-forming layer 24 prior to any etching thereof, and the material 30 selectively etched in the desired conductor path-terminal pad pattern, prior to etching of the layer 24. The resulting device is shown in FIGS. 10 and 11. In FIG. 10, the terminal pads are indicated by letters *a*, *b* and *c*, the capacitors by $C_1$ and $C_2$, and the tantalum nitride resistors by $R_1$ and $R_2$. One deposited gold conductor 31 is shown extending between terminal pad *a* and the counter electrode 29 of capacitor $C_1$, and the other gold conductor 31 is shown extending between terminal pad *b* and the counter electrode 29 of capacitor $C_2$. The equivalent electrical circuit is shown in FIG. 12 with the terminals and circuit elements appropriately labeled. By connecting terminal C to an inductor L, a frequency rejection filter will be formed. If desired, the inductor L may be formed on the substrate 21.

ALTERNATIVE EMBODIMENTS

Returning again to a consideration of FIG. 1, the second or alternative fabrication process will now be explained. After etching of the tantalum conductive pattern and removal of the first etch resist, a second etch resist, defining the resistor pattern and protecting the exposed tantalum conductive pattern, is applied. Next, both the parting layer and the resistor-forming layer are removed, in accordance with the etch resist pattern, in a single step by employing an etchant comprising a mixture of hydrofluoric and nitric acid. As noted above, the substrate 21 should have an overlying protective oxide layer when this etchant is used. The resultant structure, after etching, is essentially the same as that shown in FIGS. 8 and 9, with the exception that the resistor patterns will comprise layers of a resistive material and parting layer. The remaining steps of the fabrication process then proceed as in the process explained in detail above. It should be noted that, since the parting layer material is anodizable, the parting layer material covering the resistor pattern will be entirely converted to a nonconductive oxide during the resistor trimming step and will thus have no effect on the value of the resistors.

In lieu of the materials employed in the above-described embodiments, the resistor-forming layer could be composed of niobium nitride, and the capacitor-forming layer could be composed of niobium, the etching characteristics of which are identical to those of tantalum nitride and tantalum. Additionally, the resistor-forming and capacitor-forming properties of niobium nitride and niobium are essentially the same as those of tantalum nitride and tantalum. The parting layer instead of being composed of antimony could be composed of bismuth, tungsten, molybdenum or zirconium, all of which are anodizable, possess moderate conductivity, are unaffected by one or both of the etchants which attack the resistor-forming and capacitor-forming materials, and are attacked by etchants which do not attack the resistor-forming and capacitor-forming materials. The following table illustrates, for the lefthand process of FIG. 1, the etchants which can be employed with each of the materials which fall within the scope of this invention.

| Parting Layer | Capacitor Forming Layer [1] Etchant | Parting Layer Etchant | Resistor-Forming Layer [2] Etchant |
|---|---|---|---|
| Antimony | NaOH | $H_2SO_4$ or Aqua Regia | NaOH or HF. |
| Bismuth | NaOH | $HNO_3$, $H_2SO_4$ or Aqua Regia | NaOH or HF. |
| Molybdenum | HF | $HNO_3$ or $H_2SO_4$ | NaOH or HF. |
| Tungsten | KOH or HF | Aqua Regia, $H_2SO_4$ | NaOH or HF. |
| Zirconium | NaOH | Aqua Regia | NaOH or HF. |

[1] Capacitor-forming layer of tantalum or niobium.
[2] Resistor-forming layer of tantalum nitride or niobium nitride.

It is to be understood that the above-described embodiments are merely illustrative of the principles of the invention. Various other embodiments may be readily devised by those skilled in the art which will embody these principles and fall within the spirit and scope thereof.

What is claimed is:

1. A multilayered, thin-film intermediate for use in fabricating integrated thin-film circuits, which comprises:
   (a) an electrically nonconductive substrate;
   (b) a layer of a resistive material selected from the group consisting of tantalum nitride and niobium nitride adhering to at least a portion of one surface of the substrate;
   (c) a parting layer of a material selected from the group consisting of antimony, bismuth, molybdenum, tungsten and zirconium adhering to at least a portion of the resistive layer; and
   (d) a layer of a conductive material selected from the group consisting of tantalum and niobium adhering to at least a portion of the parting layer.

2. The intermediate of claim 1, wherein the resistive material is tantalum nitride and the conductive material is tantalum.

3. The intermediate of claim 2, wherein the parting layer material is antimony.

4. A multilayer thin-film intermediate for use in fabricating thin-film integrated circuits, which comprises:
(a) an electrically nonconductive substrate; and
(b) at least three coextensive thin films supported by the substrate, the films when viewed in a direction proceeding away from the substrate comprising, respectively, (1) tantalum nitride, (2) a material selected from the group consisting of antimony, bismuth, molybdenum, tungsten and zirconium, and (3) tantalum.

5. In a multilayered, thin-film intermediate comprising an electrically non-conductive substrate on which is deposited a plurality of metal layers, the improvement comprising:
a first layer of an anodizable, resistive material on the substrate;
a second layer of an anodizable material on said first layer; and
a third layer of an anodizable, conductive material on said second layer;
said material of said second layer
(a) being subject to attack by at least one of a first group of etchants, all of which are incapable of attacking said first and said third layers,
(b) being resistant to attack by all of a second group of etchants, selected ones of which attack said first and said third layers, and
(c) being selected from the group consisting of antimony, bismuth, molybdenum, tungsten, and zirconium.

6. The intermediate of claim 5 wherein said material of said first layer is selected from the group consisting of tantalum nitride and niobium nitride; the material of said third layer is selected from the group consisting of tantalum and niobium; said first group of etchants consists of sulfuric acid, aqua regia and nitric acid; and said second group of etchants consists of sodium hydroxide, hydrofluoric acid and potassium hydroxide.

References Cited

UNITED STATES PATENTS

| | | | |
|---|---|---|---|
| 3,256,588 | 6/1966 | Sikina et al. | 117—212 X |
| 3,387,952 | 6/1968 | La Chapelle | 29—195 X |
| 3,406,043 | 10/1968 | Balde | 117—212 |

L. DEWAYNE RUTLEDGE, Primary Examiner

E. L. WEISE, Assistant Examiner

U.S. Cl. X.R.

29—198